3,819,809
NOVEL HALOPHOSPHAZINE COMPOUNDS
Sanford S. Jacobs, Iselin, N.J., assignor to M & T
Chemicals Inc., Greenwich, Conn.
No Drawing. Filed Aug. 27, 1970, Ser. No. 67,596
Int. Cl. C01b 25/00, 21/00; C09k 3/00
U.S. Cl. 423—300     3 Claims

ABSTRACT OF THE DISCLOSURE

Novel compositions of the formula $$[X(PNX_2)_{n-1}PX_3][MX_{v+1}]_m$$

wherein X is a halogen; n is a positive number and preferably 1-20; M is a metal ion having a valence v; and v is an integer 1-7 are prepared by reacting a phosphorus halide, an ammonium halide, a halogen and metal halide. The compositions are useful as damping fluids and as polymerization catalysts.

---

The invention described herein was made in the performance of work under a NASA contract and is subject to the provisions of Section 305 of the National Aeronautics and Space Act of 1958, Public Law 85-568 (72 Stat. 435; U.S.C. 2457).

This invention relates to novel processes and compositions of matter, and to new gyro-flotation fluids. More particularly, this invention relates to novel phosphorus containing compositions and compounds which may be prepared according to the reaction:

(I) $nPX_3 + (n-1)NH_4X + nX_2 + MX_v \xrightarrow{\text{heat}}$ 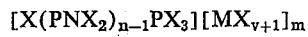
$[X(PNX_2)_{n-1}PX_3][MX_{v+1}]_m + (4n-1)HX$ wherein X is a halogen atom (Br, Cl, F, I); n is a number 1-20 (preferably 2-10); M is a metal of Groups I-VIII of the Periodic Table (*Handbook of Chemistry and Physics*, 39th edition, Chemical Rubber Publishing Company, pp. 400-401); v is an integer 1-7 corresponding to the valence of the metal M; m is an integer 1-5; and at least two different halogen atoms are present in the halophosphazene product.

The preferred reaction is generally carried out using bromine and chlorine as the different halogen atoms according to the reaction:

$nPCl_3 + (n-1)NH_4Br + nBr_2 + MV_v \rightarrow$
$[X(PNX_2)_{n-1}PX_3][MX_{v+1}] + (4n-1)HX$ wherein n is a number preferably greater than 1 (usually 1-10); M is a metal, X is bromine or chlorine; and v is an integer indicating the valence of the metal M.

The compositions of the invention are prepared by reacting a phosphorus halide (including mixed halides such as $PBrCl_2$, $PBr_2Cl$, etc.) with an ammonium halide in the presence of a source of halogen (such as $Br_2$, $Cl_2$, or a compound which readily releases such halogens) and a metal halide.

The reaction may be carried out at any convenient temperature and pressure to drive off hydrogen halides, but temperatures of 140-170° C. are preferred. The reaction is generally carried out using an inert solvent (such as 1,2,4-trichlorobenzene, benzene, carbon tetrachloride, chlorobenzene, etc.). Stoichiometric quantities of reactants may be used depending upon the molecular weight of the products desired or an excess of one or more reactants may be used to prepare mixtures which contain portions of the starting materials. Generally, there is no advantage to having portions of the reactants in the final product and stoichiometric reaction proportions are preferred.

Typical starting materials include the following:

PHOSPORUS HALIDES

Mixed halides may also be used. At least one mole of phosphorus per mole of metal halide is preferred.

| | |
|---|---|
| $PCl_3$ | $PF_3$ |
| $PBr_3$ | $PI_3$ |
| $PBr_2Cl$ | $PICl_2$ |
| $PBr_2Cl_2$ | |

METAL HALIDES

Preferably heavy metal halides of metals having a density of 2.0 gm./cc. or more.

| | | | |
|---|---|---|---|
| $ZnBr_2$ | $AlBr_3$ | $BiCl_3$ | $VBr_3$ |
| $ZnCl_2$ | $AlCl_3$ | $BiBr_3$ | $FeBr_2$ |
| $CuBr$ | $AlF_3$ | $BiBr_2Cl$ | $FeBr_3$ |
| $CuBr_2$ | $AlBr_2Cl$ | $BiBrCl_2$ | $FeCl_2$ |
| $CuCl$ | $CoBr_2$ | $AuBr$ | $FeCl_3$ |
| $MnBr_2$ | $CoCl_3$ | $VCl_2$ | $TlBr$ |
| $MnCl_2$ | $CoCl_2$ | $VCl_3$ | $TlBr_3$ |
| $MnCl_3$ | $CoBr_3$ | $VCl_5$ | $TlCl$ |
| $MnF_3$ | $AuCl$ | $AsCl_3$ | $TlCl_3$ |
| $HgCl$ | $ZnBr_2$ | $SbCl_3$ | $ZrCl_4$ |
| $HgBr$ | $ZnCl_2$ | $SbF_5$ | $UCl_4$ |
| $HgCl_2$ | $GeBr_4$ | $PbBr_2$ | $SbCl_5$ |
| $HgBr_2$ | $TiBr_4$ | $AgCl$ | $SbBr_3$ |
| $HgF$ | $CdCl_2$ | $CrCl_3$ | | etc.

AMMONIUM HALIDES

At least one mole of phosphorus in excess of each mole of ammonium halide.

| | |
|---|---|
| $NH_4Cl$ | $NH_4F$ |
| $NH_4Br$ | $NH_4I$ |

The liquid compositions of the invention are useful as damping fluids and are particularly useful as gyro-flotation fluids. The fluids prepared according to the invention herein are very dense yet are of moderate viscosity. The densities are in the region of about 2-4 gm./cm.³ (usually about 3 gm./cm.³) and have a substantial viscosity (Newtonian flow of better than 1 percent at 57° C.). The compositions are relatively inert and are compartible with beryllium, steel, aluminum, die-cast alloys containing zinc, etc. The compositions are non-conductors of electricity and are stable in storage (especially under inert nitrogen atmosphere). The compositions have negligible vapor pressure and remain liquids over a wide temperature range (18-7200° C.).

In addition the novel compositions of the invention may be used as lubricant additives and as sources of metal in place of metal salts, for example, as catalysts for polymerization of olefins.

The preferred compositions for use as gyroscope damping fluids include $P_5N_4Br_{13}Cl_5Sb$ and $P_6N_5Br_{17}Cl_3Sb$.

The following examples are presented for the purpose of illustration only and are not to be construed as limiting the scope of the invention in any way.

Example 1.—Preparation of $P_4N_3Br_{10}Cl_3Zn$

The following were combined in 300 cc. 1,2,4-trichlorobenzene solvent: 45 grams (0.2 mole) of $ZnBr_2$, 137 grams (1 mole) of $PCl_3$, 65.5 cc. (1.2 mole) of bromine, and 196 grams (2.0 moles) of ammonium bromide and heated to 145° C. in an oil bath. The reactants were maintained at 145° C. until the evolution of hydrogen halides was complete. The reaction product was filtered hot and washed with hot solvent. The product $P_4N_3Br_{10}Cl_3Zn$ was washed with benzene and the last traces of solvent were removed by vacuum at 150° C.

Example 2.—Preparation of $P_3N_2Br_8SbCl_4$

The following were combined in 300 cc. of 1,2,4-trichlorobenzene solvent: 123 grams of $SbCl_3$, 186 grams of $PCl_3$, 259 grams of bromine, and 196 grams of ammonium bromide. The mixture was heated to 145° C. in an oil bath and maintained at this temperature until the evolution of hydrogen halides was complete. The reaction product $P_3N_2Br_8SbCl_4$ was filtered hot, washed with hot solvent, then separated and washed with benzene and two 150 cc. portions of carbon tetrachloride. The last traces of solvent were removed by vacuum at 150° C. The yield was 189 grams of a dark, viscous oil ($d_4^{20}$ 2.93 gm./cc., 58° C.-700 centipoises). The molecular weight determined cryoscopically in nitrobenzene was 180.

Examples 3–15

Using the general method of Example 1 and the mole ratios of starting materials shown in Table I, the following products were prepared:

TABLE I

| Example number: | Mole ratio P/M (Phosphorus: metal) | $PX_3$ | $MY_v$ | $X_2$ | $NH_4X$ | Product |
|---|---|---|---|---|---|---|
| 3 | 6.7 | $PCl_3$ | $ZnBr_2$ | $Br_2$ | $NH_4Br$ | $P_7N_6Br_{18}ClZn$ |
| 4 | 2.9 | $PCl_3$ | $ZnBr_2$ | $Br_2$ | $NH_4Br$ | $P_3N_2Br_7Cl_2Zn$ |
| 5 | 2.0 | $PCl_3$ | $ZnBr_2$ | $Br_2$ | $NH_4Br$ | $P_2NBr_5Cl_2Zn$ |
| 6 | 3.0 | $PCl_3$ | $CuCl_2$ | $Br_2$ | $NH_4Br$ | $P_5N_4Br_{12}Cl_8Cu$ |
| 7 | 2.2 | $PCl_3$ | $MnCl_4$ | $Br_2$ | $NH_4Br$ | $P_6N_5Br_{16}Cl_4Mn$ |
| 8 | 3.0 | $PCl_3$ | $AlCl_3$ | $Br_2$ | $NH_4Br$ | $P_3N_2Br_8Cl_3Al$ |
| 9 | 3.1 | $PCl_3$ | $CoCl_2$ | $Br_2$ | $NH_4Br$ | $P_3N_2Br_8Cl_2Co$ |
| 10 | 3.1 | $PCl_3$ | $BiCl_3$ | $Br_2$ | $NH_4Br$ | $P_5N_4Br_{11}Cl_6Bi$ |
| 11 | 6.7 | $PCl_3$ | $AuCl$ | $Br_2$ | $NH_4Br$ | $P_{4.5}N_{3.5}Br_{13}Cl_3Au$ |
| 12 | 3.2 | $PCl_3$ | $VCl_5$ | $Br_2$ | $NH_4Br$ | $P_{3.5}N_{2.5}Br_7Cl_5V$ |
| 13 | 2.9 | $PCl_3$ | $FeCl_2$ | $Br_2$ | $NH_4Br$ | $P_2NBr_8Cl_2Fe$ |
| 14 | 3.0 | $PCl_3$ | $TlCl_2$ | $Br_2$ | $NH_4Br$ | $P_{4.5}N_{3.5}Br_{11}Cl_2Tl$ |
| 15 | 5.0 | $PCl_3$ | $HgCl$ | $Br_2$ | $NH_4Br$ | $P_5N_4Br_{13}Cl_2Hg$ |

Similar results may be obtained using other halogens and halide compounds as set forth in the specification. Although this invention has been illustrated by reference to specific embodiments, modifications thereof which are clearly within the scope of the invention will be apparent to those skilled-in-the-art.

I claim:

1. A halophosphazine of the formula $$[X(PNX_2)_nPX_3]MX_{v+1}$$

wherein each X is individually selected from the group consisting of bromine and chlorine, with the proviso that the numerical ratio of bromine to chlorine atoms is between 1:1 and 7.5:1; $n$ represents a number between 2.0 and 7.0 inclusive; M represents a metal selected from the group consisting of antimony, aluminum, bismuth, cobalt, copper, gold, iron, manganese, mercury, thallium, vanadium and zinc, and $v$ represents the valance state of M, said halophosphazine having been prepared by heating a mixture of (a) a halide selected from the group consisting of the chlorides and bromides of antimony, aluminum, bismuth, cobalt, copper, gold, iron, manganese, mercury, thallium, vanadium and zinc, (b) phosphorus trichloride, (c) bromine, and (d) ammonium bromide and continuing the heating at least until the evolution of hydrogen halides is substantially complete and then separating the halophosphazine from the reaction mixture.

2. A halophosphazine as described in claim 1 wherein $n$ is 5, M is antimony, $v$ is 5, 13 of the X represent bromine atoms and the remaining 5 represent chlorine atoms.

3. A halophosphazine as described in claim 1 wherein $n$ is 6, M is antimony, $v$ is 5, 17 of the X represent bromine atoms and the remaining 3 represent chlorine atoms.

References Cited

UNITED STATES PATENTS

| 3,449,091 | 6/1969 | Nichols | 23—357 |
| 3,359,080 | 12/1967 | Ridgway et al. | 23—357 |

OTHER REFERENCES

Rice et al., "Journal of Inorganic and Nuclear Chemistry," vol. 5, pp. 190–200 (1958).

MILTON WEISSMAN, Primary Examiner

U.S. Cl. X.R.

252—437, 67